United States Patent
Samson et al.

(10) Patent No.: US 10,948,622 B2
(45) Date of Patent: Mar. 16, 2021

(54) BUCKING TO IMPROVE PERMANENT RESERVOIR MONITORING SENSITIVITY

(71) Applicant: Halliburton Energy Services, Inc., Houston, TX (US)

(72) Inventors: Etienne Samson, Cypress, TX (US); Ahmed E. Fouda, Houston, TX (US); Burkay Donderici, Houston, TX (US); Glenn Andrew Wilson, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 37 days.

(21) Appl. No.: 15/759,806

(22) PCT Filed: Dec. 17, 2015

(86) PCT No.: PCT/US2015/066455
§ 371 (c)(1),
(2) Date: Mar. 13, 2018

(87) PCT Pub. No.: WO2017/105467
PCT Pub. Date: Jun. 22, 2017

(65) Prior Publication Data
US 2018/0259672 A1    Sep. 13, 2018

(51) Int. Cl.
*G01V 3/28* (2006.01)
*E21B 43/20* (2006.01)
(Continued)

(52) U.S. Cl.
CPC ............ *G01V 3/28* (2013.01); *E21B 43/20* (2013.01); *E21B 47/10* (2013.01); *E21B 47/113* (2020.05); *G01V 3/34* (2013.01)

(58) Field of Classification Search
None
See application file for complete search history.

(56) References Cited

U.S. PATENT DOCUMENTS 3,087,546 A * 4/1963 Woolley .................. E21B 29/00
166/277
4,831,331 A * 5/1989 De ........................... G01V 3/30
324/338

(Continued)

FOREIGN PATENT DOCUMENTS

WO    WO-2015/047800 A1    4/2015
WO    WO-2015/051129 A1    4/2015

OTHER PUBLICATIONS

International Search Report and Written Opinion from PCT/US2015/066455, dated Aug. 19, 2016, 18 pages.

*Primary Examiner* — Paresh Patel
(74) *Attorney, Agent, or Firm* — McGuireWoods, LLP

(57) ABSTRACT

A well monitoring system includes a plurality of transmitter coils coupled to an exterior of a casing positioned within a wellbore, wherein one or more first transmitter coils are positioned at a first location and one or more second transmitter coils are positioned at a second location axially offset from the first location. At least one receiver coil is coupled to the exterior of the casing and positioned at the second location. A power source is communicably coupled to the one or more first and second transmitter coils. The one or more first transmitter coils generates a magnetic field detectable by the at least one receiver coil, and the one or more second transmitter coils generates a bucking signal that minimizes a direct coupling between the one or more first transmitter coils and the at least one receiver coil.

20 Claims, 6 Drawing Sheets

(51) Int. Cl.
*G01V 3/34* (2006.01)
*E21B 47/10* (2012.01)
*E21B 47/113* (2012.01)

(56) References Cited

U.S. PATENT DOCUMENTS

| | | | |
|---|---|---|---|
| 5,200,705 A * | 4/1993 | Clark | G01V 3/20 324/338 |
| 5,892,460 A * | 4/1999 | Jerabek | G01V 3/28 324/342 |
| 7,026,820 B2 | 4/2006 | Xiao et al. | |
| 7,501,829 B2 | 3/2009 | Davydychev et al. | |
| 2004/0207403 A1 | 10/2004 | Fanini et al. | |
| 2005/0093547 A1 | 5/2005 | Xiao et al. | |
| 2008/0265894 A1* | 10/2008 | Snyder | G01V 3/28 324/343 |
| 2010/0026280 A1 | 2/2010 | Davydychev et al. | |
| 2010/0134113 A1* | 6/2010 | DePavia | G01V 3/28 324/346 |
| 2014/0191761 A1 | 7/2014 | San Martin et al. | |

* cited by examiner

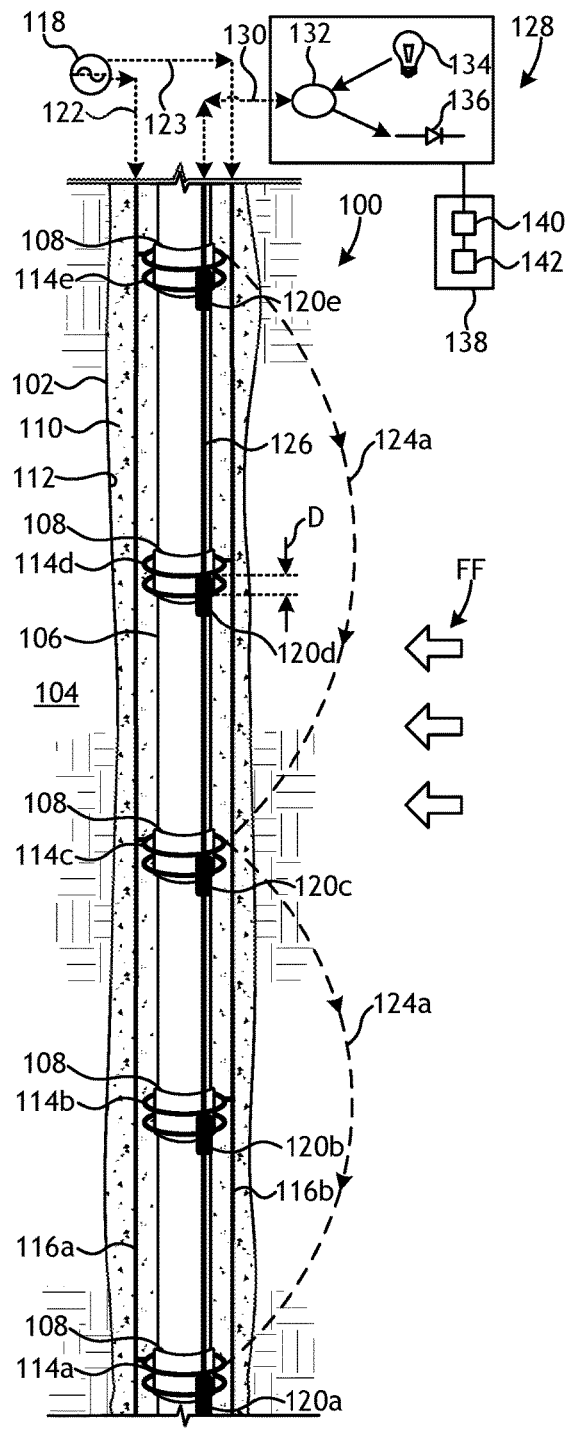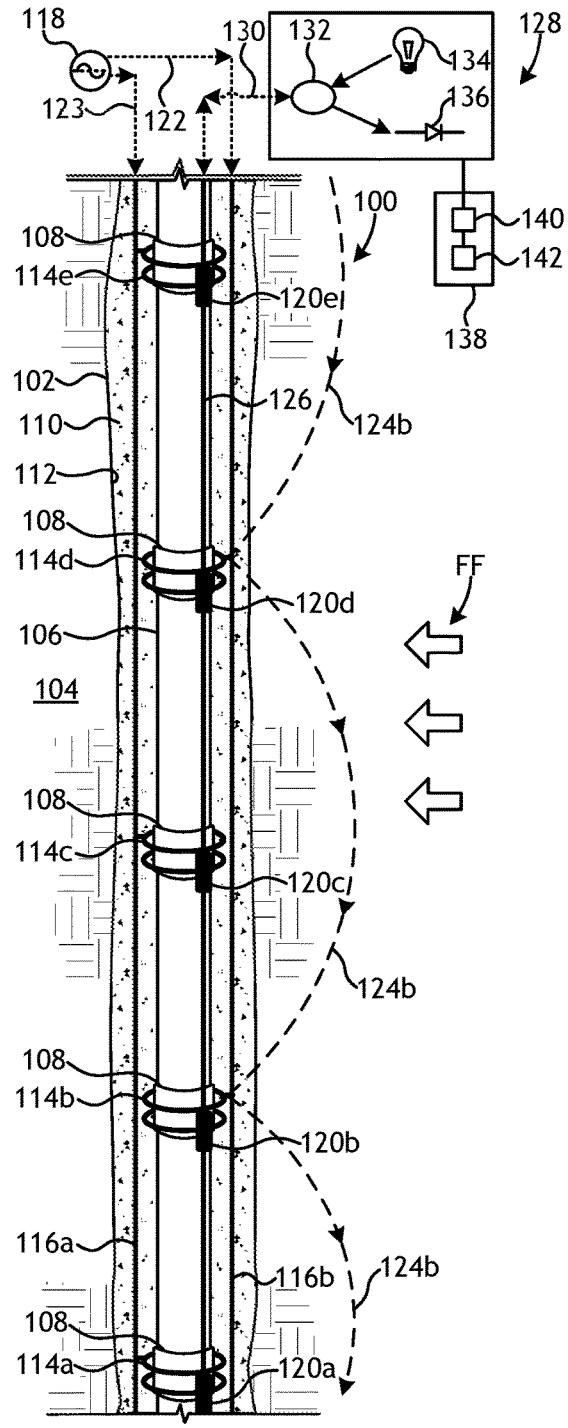

BUCKING TO IMPROVE PERMANENT RESERVOIR MONITORING SENSITIVITY

BACKGROUND

Oil field operators drill boreholes into subsurface reservoirs to recover oil and other hydrocarbons. If the reservoir has been partially produced or if the oil is particularly viscous, an oil field operator will often inject (or "flood") water or other fluids (e.g., gas, carbon dioxide, steam, etc.) into the reservoir via one or more secondary wells to encourage the hydrocarbons to move toward the production well to be produced to the surface. Such operations are known as enhanced oil recovery operations.

The flooding process can be tailored with varying fluid mixtures, flow rates/pressures, and injection sites, but may nevertheless be difficult to control due to inhomogeneity in the pore structure of the subsurface formations. The interface between the reservoir fluid and the injected fluid, often termed the "flood front" or the "waterflood front," can develop protrusions and irregularities ("fingers") that may reach the production well before the bulk of the residual oil has been flushed from the reservoir. Breakthrough of the flood fluid is undesirable, as it typically necessitates increased fluid handling due to dilution of the oil by the injected fluid and may further reduce the drive pressure on the oil. Continued operation of the well often then becomes commercially infeasible.

Accordingly, it can be useful to monitor a waterflood front as it approaches the production well and simultaneously detecting any changes in the reservoir. One technique often used to monitor waterflood fronts is to use electromagnetic field sensors deployed outside wellbore casing for permanent reservoir monitoring. One challenge facing conventional waterflood monitoring systems is that the signal due to the waterflood may represent only a small fraction (sometimes 1% or less) of the total measured signal. This is likely the case in scenarios involving flood fingering, low contrast flood fronts, or distant waterflood detection (50 ft. away or more). In such cases, the sensors are required to have a dynamic range high enough to resolve the signal due to flood. This high dynamic range, however, may be hard to achieve with many sensors.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 1A and 1B illustrate an exemplary well system that can incorporate the principles of the present disclosure.

DETAILED DESCRIPTION

Figure 2A:
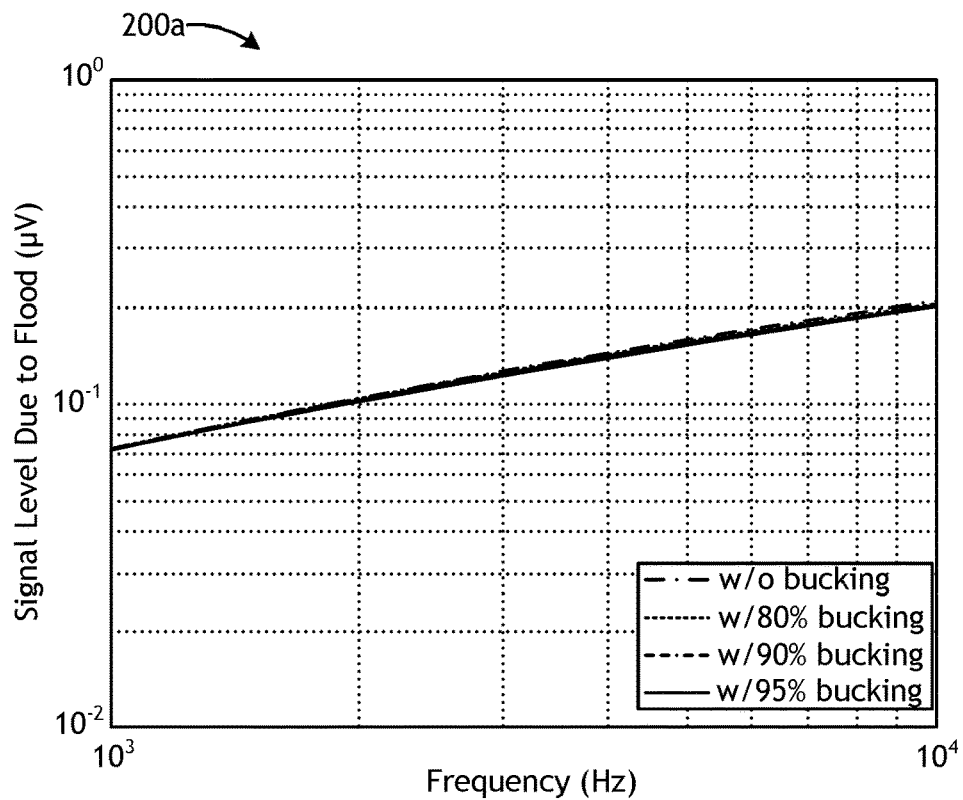
FIG. 2A is a plot showing signal level obtained from a fluid flood.

The present disclosure is related to downhole reservoir monitoring and, more particularly, to permanent well monitoring systems that incorporate bucking to improve monitoring sensitivities.

The embodiments described herein provide method for improving the dynamic range of magnetic field (or induction) sensors deployed behind casing in permanent well monitoring systems. The well monitoring systems described herein include a plurality of transmitter coils and a plurality of receiver coils deployed along the monitor depth of interest in a wellbore. At least one of the transmitter coils may be used a bucking coil to mitigate or cancel the direct coupling signal between the transmitting coils and the receiving coils. In one embodiment, alternate transmitter coils are connected to two or more power lines that are independently controlled. In one cycle, a group of transmitter coils acts as the main transmitting coils and the other group of transmitter coils act as bucking coils. The two groups switch roles in a second cycle, which ensures scanning the whole depth of interest. In some embodiments, current supplied to the bucking coils may be adjusted and otherwise calibrated so that the bucking coils generate equal but opposite phase signals at the receiver coils right after deployment in the wellbore and prior to detection of an approaching fluid flood. As the fluid flood approaches, however, the majority of the received signal will be due to the fluid flood. The bucking current may then be dynamically adjusted and thereby utilizing the full dynamic range of the receiver coils to resolve the signals to due to the fluid flood.

FIGS. 1A and 1B depict an exemplary well monitoring system 100 that can incorporate the principles of the present disclosure, according to one or more embodiments. As illustrated, a wellbore 102 has been drilled into an earth formation 104 and contains a string of casing 106. As used herein, the term "casing" refers to a protective wellbore lining, as known in the art, and can include lengths of pipe coupled end to end using a casing collar 108. The casing 106 can be made of a metal (e.g., steel) or a non-metal (e.g., fiberglass or another composite material) and is secured within the wellbore 102 using cement 110 deposited in the annulus 112 defined between the casing and the inner wall of the wellbore 102. In some embodiments, casing centralizers (not shown) can be used to preserve the spacing between the casing 106 and the wall of the wellbore 102 and, therefore, protect the component parts external to the casing 106 from damage as the casing 106 is deployed.

The well monitoring system 100 further includes a plurality of transmitter coils 114, shown as transmitter coils 114a, 114b, 114c, 114d, and 114e. While only five transmitter coils 114a-e are depicted in FIG. 1, more or less than five transmitter coils 114a-e may be employed in the well monitoring system 100 at any one axial location, without departing from the scope of the disclosure. The transmitter coils 114a-e may be axially-spaced from each other along the casing 106 depending on the length of the desired monitoring zone and the required vertical resolution. Depending on the physical characteristics of the formation 104, the transmitter coils 114a-e may be axially spaced from each other by about 15 feet to about 30 feet. In at least one embodiment, as illustrated, the transmitter coils 114a-e may be mounted on corresponding casing collars 108, which may be approximately 30 feet away from each other.

In some embodiments, the transmitter coils 114*a-e* may each comprise an axial coil wound atop a non-conductive sleeve (not shown) around the casing 106, such as at the casing collar 108. In embodiments where the casing 106 is made of steel, for example, the non-conductive sleeves are used to preserve the spacing between the coil winding and the material of the casing 106 and thereby avoid shorting the signal. The non-conductive sleeves may exhibit a thickness of about 0.25 inches to about 0.5 inches, and may be made of materials that can withstand temperatures and pressures downhole. Suitable materials for the non-conductive sleeves include, but are not limited to, ceramic, fiberglass, and an epoxy resin. Alternatively, the non-conductive sleeves may be replaced with high magnetic permeability sleeves (not shown) to enhance the signal level of the transmitter coils 114*a-e*.

In the illustrated embodiment, alternating pairs of transmitter coils 114*a-e* are communicably coupled to a first power line 116*a* and a second power line 116*b*. More particularly, the first transmitter coil 114*a*, the third transmitter coil 114*c*, and the fifth transmitter coil 114*e*, collectively referred to in this embodiment as the "odd transmitter coils," are communicably coupled to the first power line 116*a*, while the second transmitter coil 114*b* and the fourth transmitter coil 114*d*, collectively referred to in this embodiment as the "even transmitter coils," are communicably coupled to the second power line 116*b*. Accordingly, the odd transmitter coils 114*a,c,e* are connected in series to the first power line 116*a* and the even transmitter coils 114*b,d* are connected in series to the second power line 116*b*.

Each power line 116*a,b* may be communicably coupled to a power supply 118, which may be arranged at a surface location or downhole. Via the power supply 118, the first power line 116*a* independently controls the odd transmitter coils 114*a,c,e* and the second power line 116*b* independently controls the even transmitter coils 114*b,d*. The power supply 118 may be configured to excite adjacent pairs of odd or even transmitter coils 114*a-e* within each power line 116*a,b* with either a main current 122 or a bucking current 123. In FIG. 1A, for example, the power supply 118 supplies the main current 122 to the odd transmitter coils 114*a,c,e*, which results in the generation of magnetic fields 124*a* between adjacent pairs of odd transmitter coils 114*a,c,e*. In FIG. 1B, the power supply 118 supplies the main current 122 to the even transmitter coils 114*b,d*, which results in the generation of magnetic fields 124*b* between adjacent pairs of even transmitter coils 114*b,d*.

The well monitoring system 100 also includes a plurality of receiver coils 120, shown as receiver coils 120*a*, 120*b*, 120*c*, 120*d*, and 120*e*. Each receiver coil 120*a-e* may comprise a pick-up coil used to convert the magnetic fields 124*a,b* generated by the transmitter coils 114*a-e* into a potential difference after interaction with the formation 104. While only five receiver coils 120*a-e* are depicted in FIG. 1, more or less than five receiver coils 120*a-e* may be employed in the well monitoring system 100 at any one axial location, without departing from the scope of the disclosure. The first receiver coil 120*a*, the third receiver coil 120*c*, and the fifth receiver coil 120*e* are collectively referred to in this embodiment as the "odd receiver coils," while the second receiver coil 120*b* and the fourth receiver coil 120*d* collectively referred to in this embodiment as the "even receiver coils."

In this embodiment, each receiver coil 120*a-e* may be mounted in close proximity to a corresponding transmitter coil 114*a-e* and otherwise axially offset from each other by an axial distance D (FIG. 1A). In the illustrated embodiment, for example, axially adjacent transmitter coils 114*a-e* and receiver coils 120*a-e* may be mounted on the same casing collar 108 and separated by an axial distance D of about 0.5 feet. The axial distance D between adjacent transmitter coils 114*a-e* and receiver coils 120*a-e* may be altered and otherwise optimized to fit a particular application, without departing from the scope of the disclosure.

The receiver coils 120*a-e* may each be communicably coupled to a communication cable 126, which is operatively and communicably coupled to a surface interface 128. The surface interface 128 may be configured to receive and analyze measurements obtained by the receiver coils 120*a-e* and thereby track the location of a fluid flood FF approaching the wellbore 102 through the formation 104. The fluid flood FF may be the result of a fluid injected into the formation 104 via a secondary or "injection" well (not shown), and the fluid of the fluid flood FF may be water, steam, a chemical, or any combination thereof. The measurements obtained by the receiver coils 120*a-e* are representative of the resistivity profile of the formation 104, and the resistivity profile, in turn, is indicative of the fluids in the pores of the formation 104, which enable a well operator to locate and track the fluid flood FF over time.

In some embodiments, the receiver coils 120*a-e* and the surface interface 128 may comprise a fiber optic sensing and processing system. In such embodiments, the communication cable 128 may include one or more optical waveguides 130, such as optical fibers or optical ribbons, and may further include other lines, such as electrical conductors, hydraulic lines, strength members, etc.

In the fiber optic example, the optical waveguide(s) 130 may be optically connected to the surface interface 128, such as through an optical port 132. As illustrated, the surface interface 128 includes a light source 134, such as a laser or a light emitting diode, and an optical detector 136, such as an opto-electric converter or a photodiode. The light source 134 launches light (electromagnetic energy) into the waveguide(s) 130, and light returned to the surface interface 128 is detected by the detector 136 after being modulated by the receivers 120*a-e*. It is noted that it is not necessary for the light to be launched into a same end of the optical waveguide(s) 130 as an end via which light is returned to the surface interface 128. Other or different equipment, such as an interferometer or an optical time domain or frequency domain reflectometer, may be included in the surface interface 128 in some examples. Accordingly, the scope of this disclosure is not limited to use of any particular type or construction of optical interrogator.

A computer 138 is used to control operation of the surface interface 128 and to record optical measurements made by the detector 136. In this example, the computer 138 includes at least a processor 140 and memory 142. The processor 140 operates the light source 134, receives measurement data from the detector 136, and manipulates the measurement data. The memory 142 stores instructions for operation of the processor 140, and stores processed measurement data. The processor 140 and memory 142 can perform additional or different functions in keeping with the scope of this disclosure. For example, the computer 138 could be used to control operation of the power supply 118, if desired. In other examples, different types of computers may be used, the computer 138 could include other equipment, such as input and output devices, etc. The computer 138 could be integrated with the surface interface 128 and/or power supply 118 into a single instrument. Thus, the scope of this disclosure is not limited to use of any particular type or construction of computer.

The optical waveguide(s) 130, the surface interface 128, and the computer 138 may comprise a fiber optic strain sensing system capable of detecting strain energy at each receiver coil 120a-e. For example, the surface interface 128 can be used to measure Brillouin or coherent Rayleigh scattering in the optical waveguide(s) 130 as an indication of strain energy, and the receiver coils 120a-e modify the light pulses to provide measurements of the magnetic fields 124a,b, such as field strength, field gradient, or time derivative for the magnetic fields 124a,b. The modifications may affect amplitude, phase, or frequency content of the light pulses, thereby enabling the detector 136 to responsively produce an electrical output signal indicative of the measurements obtained by the receiver coils 120a-e.

As indicated above, each receiver coil 120a-e may be configured to convert the magnetic fields 124a,b generated by the transmitter coils 114a-e into a potential difference. In one fiber optic-based embodiment, one or more of the receiver coils 120a-e may comprise an electromechanical transducer, such as a piezo-electric transducer. The electromechanical transducer may be operable to convert a measured voltage into strain on the optical waveguide(s) 130. The potential difference developed between the formation 104 and the receiver coil 120a-e may be applied to and deform the electromechanical transducer to induce strain in the optical waveguide(s) 130 bonded to it. Such strain applied on the optical waveguide(s) 130 may be linearly proportional to the applied potential difference.

In another fiber optic-based embodiment, one or more of the receiver coils 120a-e may comprise a magnetostrictive material bonded to the optical waveguide(s) 130. Examples of magnetostrictive materials include, but are not limited to, cobalt, nickel, and iron metals and their alloys, e.g., metglass and Terfenol-D. As the magnetostrictive material deforms due to the incident magnetic field 124a,b, it induces strain in the optical waveguide(s) 130 bonded to it, and such strain may be linearly proportional to the applied potential difference. Such receiver coils 120a-e may be packaged in electromagnetic compatible high-pressure, high-temperature packages that are connected to the communication cable 126 (e.g., a tubing encapsulated cable or "TEC"), and clamped to the casing 106 as it is deployed. Example packaging materials include INCONEL® and beryllium copper (BeCu).

The strain induced into the optical waveguide(s) 130 may be interrogated at the surface interface 128 using known fiber optic multiplexing and interrogation techniques to determine the potential difference. This obviates any need for multiplexing circuitry downhole in the wellbore 102. The surface interface 128 is operated such that the strain induced in the optical waveguide(s) 130 is linearly proportional to the applied magnetic fields 124a,b. Signals from other receiver coils 120a-e at different axial locations along the casing 106 can be communicated over the same optical waveguide(s) 130, and signals from different receiver coils 120a-e may be discriminated at the surface interface 128 using known fiber optic multiplexing and interrogation techniques. Nevertheless, while not shown, it is also contemplated herein to include an electronic switching circuit downhole that can be used to multiplex the signals from different receiver coils 120a-e to an optical waveguide 130 that delivers the signal uphole.

The well monitoring system 100 and the surface interface 128 are not limited to use in fiber optic sensor systems only. Rather, the presently disclosed embodiments are equally applicable to all electrical reservoir monitoring systems and applications. For example, in an electrical-based (i.e., non-fiber optic) embodiment, the communication cable 126 may include one or more electrical cables or conductors and the receiver coils 120a-e may comprise induction coils. In such embodiments, the potential difference measured by the induction coils may be applied to a high input impedance pre-amplifier circuit (not shown) included in each receiver coil 120a-e. The high input impedance pre-amplifier circuit may be configured to electronically telemeter the received signals to the surface interface 128 for processing.

Exemplary operation of the well monitoring system 100 will now be provided. In the illustrated embodiment, the transmitter coils 114a-e may be configured to be operated in two cycles, where the first cycle is schematically depicted in FIG. 1A and the second cycle is schematically depicted in FIG. 1B. In the first cycle, the odd transmitter coils 114a,c,e are energized (excited) with the main current 122 (e.g., high-level current) provided by the power source 118 and act as main "transmitting coils" that generate the first magnetic fields 124a. As illustrated, the first magnetic fields 124a generally extend radially outward from the first and third transmitter coils 114a,c and from the third and fifth transmitter coils 114c,e. Depending on the resistivity of the formation 104, the main current 122 may exhibit a frequency range of 1 kHz to 100 kHz may be used to generate the magnetic fields 124a.

The even transmitter coils 114b,d are also energized by the power source 118 in the first cycle, but with the bucking current 123 (e.g., a low-level current) that has an opposite phase to the phase of the main current 122 provided to the odd transmitter coils 114a,c,e. Accordingly, the even transmitter coils 114b,d positioned adjacent the even receiver coils 120b,d serve as "bucking coils" that emit a bucking signal that operates to reduce or "buck" the direct coupling signal between the transmitting coils (i.e., the odd transmitter coils 114a,c,e) and the adjacent even receiver coils 120b,d. As can be appreciated, unless properly bucked, the direct coupling signal can be far larger than the signal obtained from the formation 104 or the fluid flood FF based on the magnetic fields 124a.

Accordingly, in the first cycle, the bucking signal of the even transmitter coils 114b,d serve to cancel out (buck) or minimize the direct coupling signal at the even receiver coils 120b,d when there is no fluid flood FF; i.e., when the fluid flood FF is outside the range of detection of the receiver coils 120a-e. As the fluid flood FF approaches, however, the signal received at the even receiver coils 120b,d will be largely due to the fluid flood FF illuminated by the magnetic fields 124a generated by the odd transmitter coils 114a,c,e. Since the receiver coils 120a-e are positioned on the casing collars 108, which are separated by approximately 30 feet in the illustrated embodiment, the vertical sensitivity of this measurement is therefore in the order of two sections of casing 106 (approximately 60 ft.) centered at the even receiver coils 120b,d.

The odd receiver coils 120a,c,e receive a large direct signal from the adjacent odd transmitter coils 114a,c,e, but this signal does not bear any information about the distant fluid flood FF. Accordingly, signals obtained by the odd receiver coils 120a,c,e in the first cycle are neglected (ignored) and otherwise not processed at the surface interface 128.

In the second cycle, as shown in FIG. 1B, operation of the odd transmitter coils 114a,c,e and the even transmitter coils 114b,d switch roles, and operation of the odd receiver coils 120a,c,e and the even receiver coils 120b,d also switch roles, thereby enabling the monitoring of zones centered at the odd receiver coils 120a,c,e. Accordingly, in the second cycle, the even transmitter coils 114a,c,e receive the main current 122 and generate the magnetic fields 124b, and the odd transmitter coils 114a,c,e receive the bucking current 123 and thereby serve as bucking coils emit the bucking signal that cancels out (bucks) or minimizes the direct coupling signal between the even transmitter coils 114b,d and the odd receiver coils 120a,c,e. As the fluid flood FF approaches, the signal received at the odd receiver coils 120a,c,e will be largely due to the fluid flood FF as illuminated by the even transmitter coils 114b,d.

The even receiver coils 120b,d receive a large direct signal from the adjacent even transmitter coils 114b,d in the second cycle, but this signal does not bear any information about the distant fluid flood FF. Accordingly, signals obtained by the even receiver coils 120b,d in the second cycle are neglected (ignored) and otherwise not processed at the surface interface 128.

Receiver coils 120a-e in one cycle can be grouped based upon their required bucking current levels. An average bucking current may be applied for each group, and all receiver coils 120a-e within that group may be read simultaneously. This process is repeated for all groups within that cycle. Moreover, the same process may be repeated for the second cycle.

The following Table 1 depicts the roles of the various transmitter coils 114a-e and receiver coils 120a-e in the two-cycle embodiment of FIGS. 1A and 1B.

TABLE 1

| Casing Collar | Cycle 1 | | Cycle 2 | |
|---|---|---|---|---|
| | Transmitter | Receiver | Transmitter | Receiver |
| a | Main | Ignore | Bucking | Read |
| b | Bucking | Read | Main | Ignore |
| c | Main | Ignore | Bucking | Read |
| d | Bucking | Read | Main | Ignore |
| e | Main | Ignore | Bucking | Read |

In Table 1, the casing collar 108 corresponds to the axial location of the transmitter coils 114a-e and receiver coils 120a-e, where the first casing collar 'a' corresponds to the axial location of the first transmitter coil 114a and the first receiver coil 120a, the second casing collar 'b' corresponds to the axial location of the second transmitter coil 114b and the second receiver coil 120b, and so on. The measurements obtained during cycle 1 and cycle 2 are combined linearly by the surface interface 128 and, more particularly, by the computer 138 to obtain a vertical resolution of one section of casing 106 (approximately 30 ft.).

In some fiber-optic embodiments, the even receiver coils 120b,d may be connected to a different optical waveguide 130 as the odd receiver coils 120a,c,e. This may help avoid power level saturation due to the receiver coils 120a-e being axially adjacent the transmitter coils 114a-e.

In some embodiments, the direct coupling signal from an adjacent transmitter coil 114a-e as measured by a given receiver coil 120a-e on the same collar 108 may be used as a quality assurance metric for that transmitter/receiver link. This direct coupling signal will be mostly independent of the formation 104 and may prove advantageous in providing a means to verify that the transmitter coils 114a-e and the receiver coils 120a-e are each working properly.

Figure 2B:
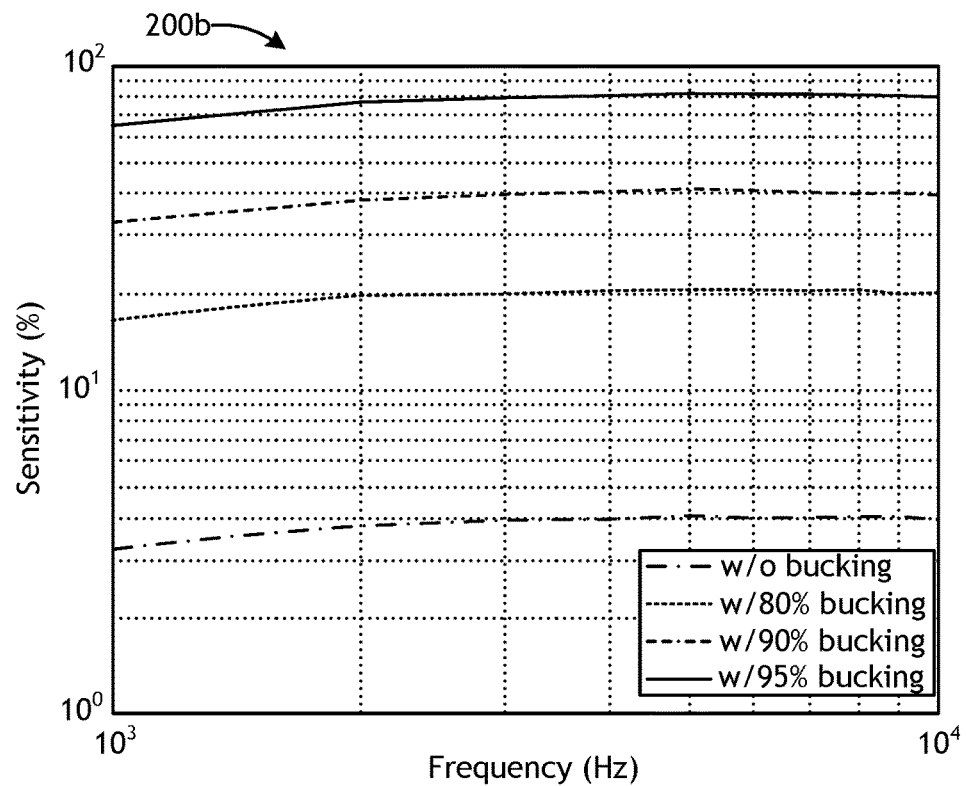
FIG. 2B is a plot showing the sensitivity of receiver coil with and without bucking.

To demonstrate the advantages that bucking can achieve in the permanent well monitoring system 100 of FIGS. 1A and 1B, simulated measurement results of the two cycles were obtained and are depicted in FIGS. 2A and 2B. More particularly, FIG. 2A is a plot 200a showing the signal level obtained from the fluid flood FF during the two cycles and FIG. 2B is a plot 200b showing the sensitivity of a given receiver coil 120a-e with and without bucking. In the model study of FIGS. 2A and 2B, it was assumed that the casing 106 was made of carbon steel, had a seven inch outer diameter, and was 0.25 inches thick. It was also assumed that the transmitter coils 114a-e and the receiver coils 120a-e were each eight inch coils having ten turns, and the current level of the main current 122 was 1 Ampere. The resistivity of the formation 104 was assumed to be 10 ohm-meters, and the resistivity of the fluid flood FF was assumed to be 1 ohm-meter, while having a thickness of 50 feet at a distance of 50 feet away from the casing 106.

As shown in FIG. 2A, the signal derived from the fluid flood FF is shown with and without bucking and is practically identical. In other words, the signal level obtained from the fluid flood FF reaching the receiver coil 120a-e, whether bucked or not by an adjacent transmitter coil 114a-e, does not change. As shown in FIG. 2B, however, the sensitivity of the receiver coil 120a-e does change. The sensitivity in FIG. 2B refers to a percentage of the fluid flood FF signal in view of the total signal (i.e., the fluid flood FF signal+the direct coupling signal). Different levels (percentages) of bucking were used in the study to determine its effect on the sensitivity. Without bucking, for example, the sensitivity of the given receiver coil 120a-e was around 3%, meaning the useful signal obtained by the given receiver coil 120a-e was only 3% of the total signal. With 80% bucking, however, where 80% of the formation 104 signal without the fluid flood FF is cancelled out by bucking, the sensitivity increased to around 20%. Accordingly, despite not being perfect, it was shown that bucking significantly improves the sensor sensitivity without sacrificing signal level.

Figure 3A:
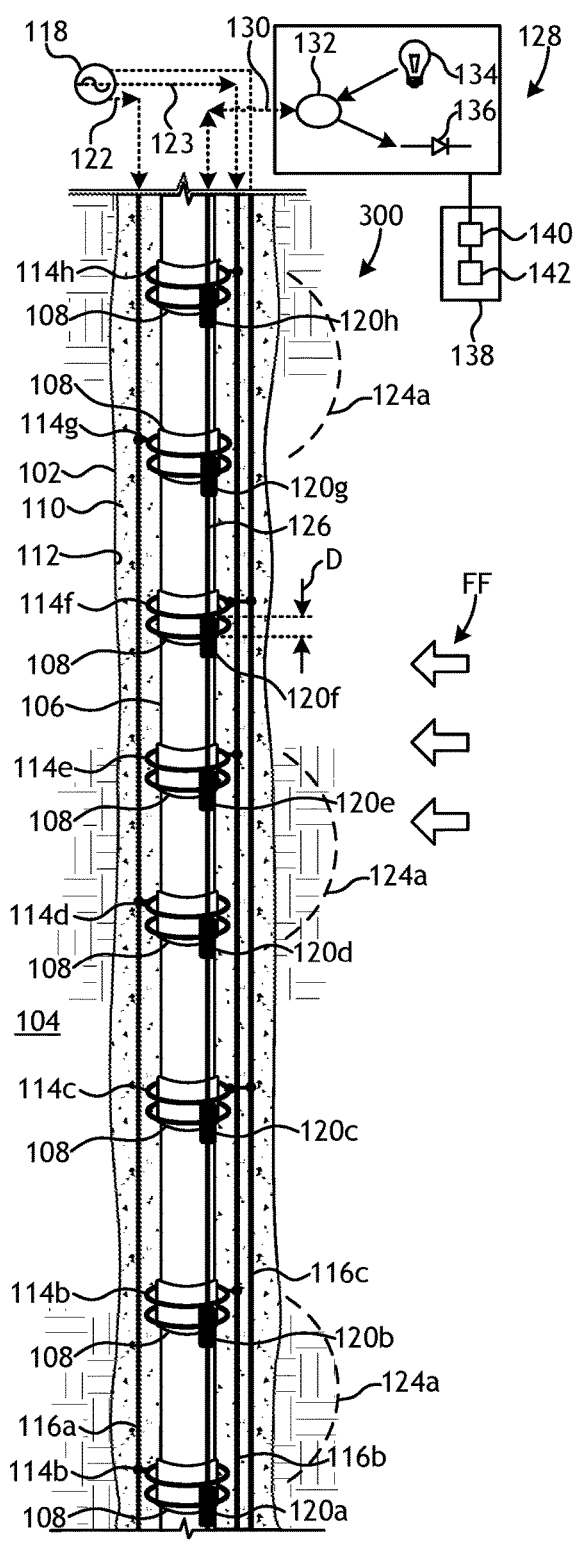
FIGS. 3A-3C illustrate another exemplary well system that can incorporate the principles of the present disclosure.
Figure 3B:
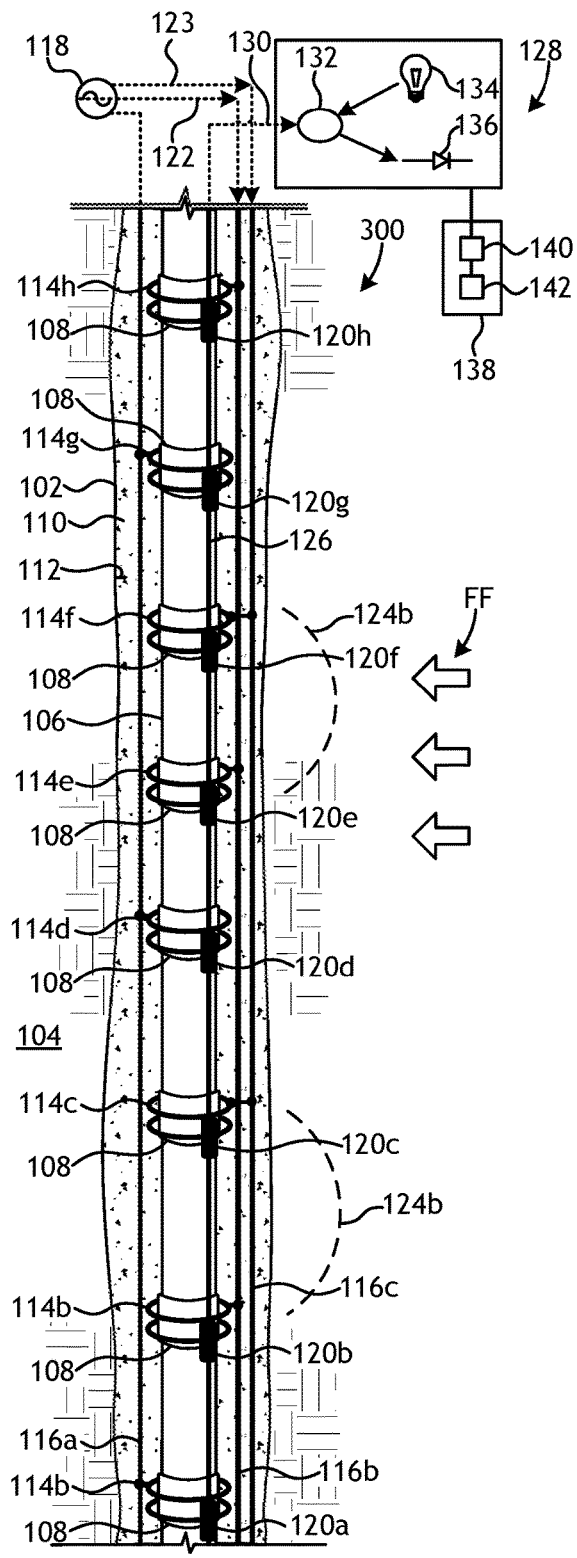
Figure 3C:
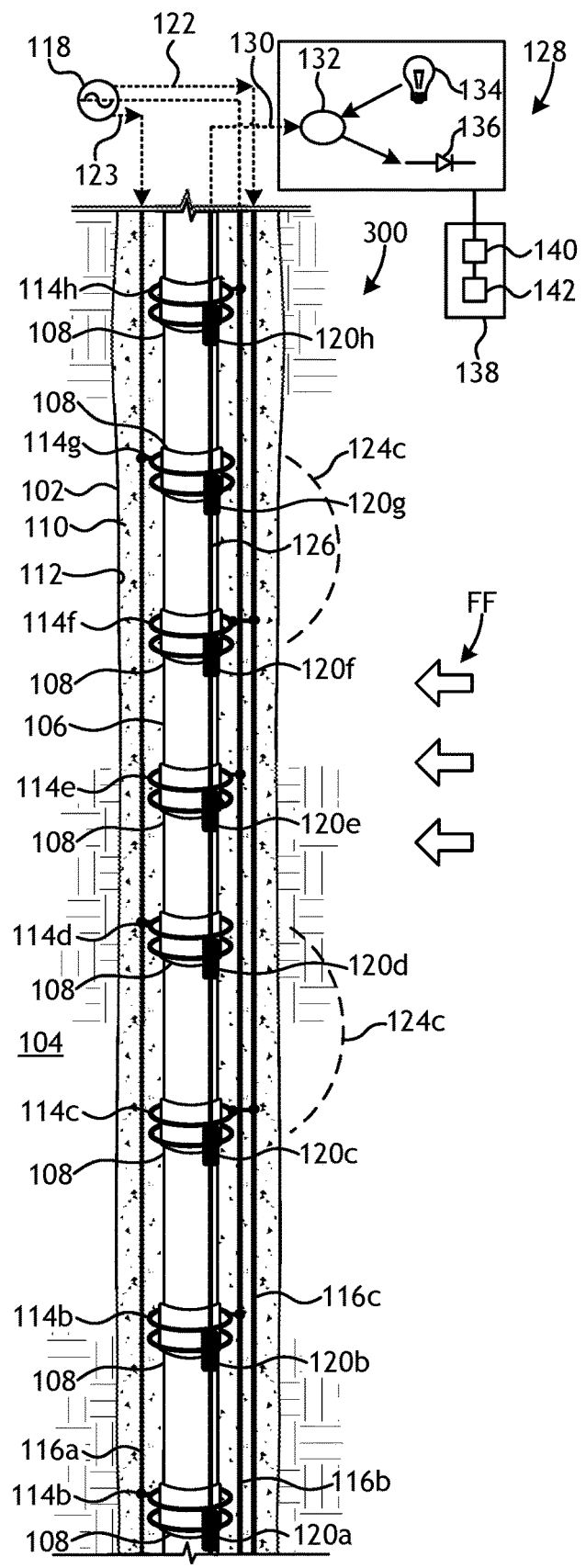

FIGS. 3A-3C depict another exemplary well monitoring system 300 that can incorporate the principles of the present disclosure, according to one or more embodiments. The well monitoring system 300 may be similar in some respects to the well monitoring system 100 of FIGS. 1A-1B and therefore may be best understood with reference thereto, where like numerals represent like elements or components not described again in detail. As illustrated, the casing 106 is again positioned within the wellbore 102 and cemented into place with the cement 110. Accordingly, the well monitoring system 300 may be characterized as a permanent reservoir monitoring system.

The well monitoring system 300 further includes the plurality of transmitter coils 114, shown as transmitter coils 114a, 114b, 114c, 114d, 114e, 114f, 114g, and 114h, axially-spaced from each other along the casing 106. In the illustrated embodiment, the transmitter coils 114a-h are again depicted as being coupled to the casing collars 108, but could alternatively be positioned at other locations, without departing from the scope of the disclosure. Moreover, the well monitoring system 300 also includes the plurality of receiver coils 120, shown as receiver coils 120a, 120b, 120c, 120d, 120e, 120f, 120g, and 120h. Each receiver coil 120a-h may be mounted in close proximity to a corresponding transmitter coil 114a-h, such as on a common casing collar 108, and otherwise axially offset from each other by the axial distance D (FIG. 3A).

In the illustrated embodiment, the transmitter coils 114a-h are grouped by every third transmitter coil 114a-h along the casing 106 and each group is independently coupled to the first power line 116a, the second power line 116b, or a third power line 116c. More particularly, the first transmitter coil 114a, the fourth transmitter coil 114d, and the seventh transmitter coil 114g (collectively referred to in this embodiment as the "first transmitter coils") are communicably coupled to the first power line 116a, the second transmitter coil 114b, the fifth transmitter coil 114d, and the eight transmitter coil 114h (collectively referred to in this embodiment as the "second transmitter coils") are communicably coupled to the second power line 116b, and the third transmitter coil 114c and the sixth transmitter coil 114f (collectively referred to in this embodiment as the "third transmitter coils") are communicably coupled to the third power line 116c. Accordingly, the first transmitter coils 114a,d,g are connected in series to the first power line 116a, the second transmitter coils 114b,e,h are connected in series to the second power line 116b, and the third transmitter coils 114c,f are connected in series to the third power line 116c.

Each power line 116a-c is communicably coupled to the power supply 118 such that the first power line 116a independently controls the first transmitter coils 114a,d,g, the second power line 116b independently controls the second transmitter coils 114b,e,h, and the third power line 116c independently controls the third transmitter coils 114c, f. The power supply 118 selectively excites axially adjacent pairs of the first, second, and third transmitter coils 114a-h within each power line 116a-c with either the main current 122 or the bucking current 123 and leaves one of the power lines 116a-c deactivated, as discussed below. Exciting the first transmitter coils 114a,d,g with the main current 122 results in the generation of the first magnetic fields 124a (FIG. 3A), exciting the second transmitter coils 114b,e,h with the main current 122 results in the generation of the second magnetic fields 124b (FIG. 3B), and exciting the third transmitter coils 114c,f with the main current 122 results in the generation of the third magnetic fields 124c (FIG. 3C).

Each receiver coil 120a-h may be configured to convert the detected magnetic fields 124a-c generated by the transmitter coils 114a-h into a potential difference after interaction with the formation 104 and the oncoming fluid flood FF. The receiver coils 120a-e are communicably coupled to the surface interface 128 via the communication cable 126, which is configured to receive and analyze measurements obtained by the receiver coils 120a-h and thereby track the location of the fluid flood FF in real-time.

Exemplary operation of the well monitoring system 300 will now be provided. In the illustrated embodiment, the transmitter coils 114a-h may be configured to be operated in three cycles, where the first cycle is schematically depicted in FIG. 3A, the second cycle is schematically depicted in FIG. 3B, and the third cycle is schematically depicted in FIG. 3C. In the first cycle, the first transmitter coils 114a,d,g are energized (excited) with the main current 122 and act as main "transmitting coils," which results in the generation of the first magnetic fields 124a, and the bucking current 123 is provided to the second transmitter coils 114b,e,h. The third transmitter coils 114c,f remain inactive (i.e., no signal is provided or "deactivated") in the first cycle.

In the first cycle, the receiver coils 120b,e,h obtain measurements from the formation 104 and the fluid flood FF in response to the first magnetic fields 124a. The second transmitter coils 114b,e,h positioned adjacent the receiver coils 120b,e,h serve as "bucking coils" that emit a bucking signal that reduces or "bucks" the direct coupling signal between the first transmitter coils 114a,d,g and the axially adjacent receiver coils 120b,e,h. Consequently, as the fluid flood FF approaches, the signal received at the receiver coils 120b,e,h will be largely due to the fluid flood FF illuminated by the magnetic fields 124a rather than the direct coupling signal. The receiver coils 120a,d,g receive a large direct signal from the adjacent first transmitter coils 114a,d,g in the first cycle, but this signal does not bear any information about the distant fluid flood FF. Accordingly, signals obtained by the receiver coils 120a,d,g in the first cycle are neglected (ignored) and otherwise not processed at the surface interface 128.

In the second cycle, as shown in FIG. 3B, the second transmitter coils 114b,e,h are energized (excited) with the main current 122, which results in the generation of the second magnetic fields 124b, and the bucking current 123 is provided to the third transmitter coils 114c,f. The first transmitter coils 114a,d,g are deactivated in the second cycle. Accordingly, in the second cycle, the receiver coils 114c,f obtain measurements from the formation 104 and the fluid flood FF in response to the second magnetic fields 124b, and the third transmitter coils 114c,f positioned adjacent the receiver coils 120c,f emit a bucking signal that operates to reduce or "buck" the direct coupling signal between the second transmitter coils 114b,e,h and the axially adjacent receiver coils 120c,f. Consequently, as the fluid flood FF approaches, the signal received at the receiver coils 120c,f will be largely due to the fluid flood FF illuminated by the second magnetic fields 124b rather than the direct coupling signal. The receiver coils 120b,e,h receive a large direct signal from the adjacent second transmitter coils 114b,e,h in the second cycle, but these signals are neglected (ignored) since they do not bear any information about the distant fluid flood FF.

Lastly, in the third cycle, as shown in FIG. 3C, the third transmitter coils 114c,f are energized (excited) with the main current 122, which results in the generation of the third magnetic fields 124c, and the bucking current 123 is provided to the first transmitter coils 114a,d,g. The second transmitter coils 114b,e,h are deactivated in the third cycle. Accordingly, in the third cycle, the receiver coils 120a,d,g obtain measurements from the formation 104 and the fluid flood FF in response to the third magnetic fields 124c, and the first transmitter coils 114a,d,g positioned adjacent the receiver coils 120a,d,g emit a bucking signal that operates to reduce or "buck" the direct coupling signal between the third transmitter coils 114c,f and the axially adjacent receiver coils 120a,d,g. Consequently, as the fluid flood FF approaches, the signal received at the receiver coils 120a,d,g will be largely due to the fluid flood FF illuminated by the third magnetic fields 124c rather than the direct coupling signal. The receiver coils 120c,f receive a large direct signal from the adjacent third transmitter coils 114c,f in the third cycle, but these signals are neglected (ignored) since they do not bear any information about the distant fluid flood FF.

The following Table 2 depicts the roles of the various transmitter coils 114a-h and receiver coils 120a-h in the three-cycle embodiment of FIGS. 3A and 3B.

TABLE 2

| Casing Collar | Cycle 1 | | Cycle 2 | | Cycle 3 | |
|---|---|---|---|---|---|---|
| | Transmitter | Receiver | Transmitter | Receiver | Transmitter | Receiver |
| a | Main | Ignore | Deactivated | Ignore | Bucking | Read |
| b | Bucking | Read | Main | Ignore | Deactivated | Ignore |

TABLE 2-continued

| Casing Collar | Cycle 1 | | Cycle 2 | | Cycle 3 | |
|---|---|---|---|---|---|---|
| | Transmitter | Receiver | Transmitter | Receiver | Transmitter | Receiver |
| c | Deactivated | Ignore | Bucking | Read | Main | Ignore |
| d | Main | Ignore | Deactivated | Ignore | Bucking | Read |
| e | Bucking | Read | Main | Ignore | Deactivated | Ignore |
| f | Deactivated | Ignore | Bucking | Read | Main | Ignore |
| g | Main | Ignore | Deactivated | Ignore | Bucking | Read |
| h | Bucking | Read | Main | Ignore | Deactivated | Ignore |

In Table 2, the casing collar 108 corresponds to the location of the transmitter coils 114a-h and receiver coils 120a-h, where the first casing collar 'a' corresponds to the axial location of the first transmitter coil 114a and the first receiver coil 120a, the second casing collar 'b' corresponds to the axial location of the second transmitter coil 114b and the second receiver coil 120b, and so on. The measurements obtained during cycles 1, 2, and 3 can then be combined through linear operations, such as weighted summation, by the surface interface 128 and, more particularly, by the computer 138 to obtain a vertical resolution of one section of casing 106 (approximately 30 ft.).

At least one advantage to the three-cycle embodiment of FIGS. 3A-3C over the two-cycle embodiment of FIGS. 1A-1B is that in each cycle the sensitivity of the measurements is in the order of one section of casing 106, since each receiver coil 120a-h picks up a signal generated mainly by one main transmitter coil 114a-h. This can improve the vertical resolution of the well monitoring system 300.

Figure 4:
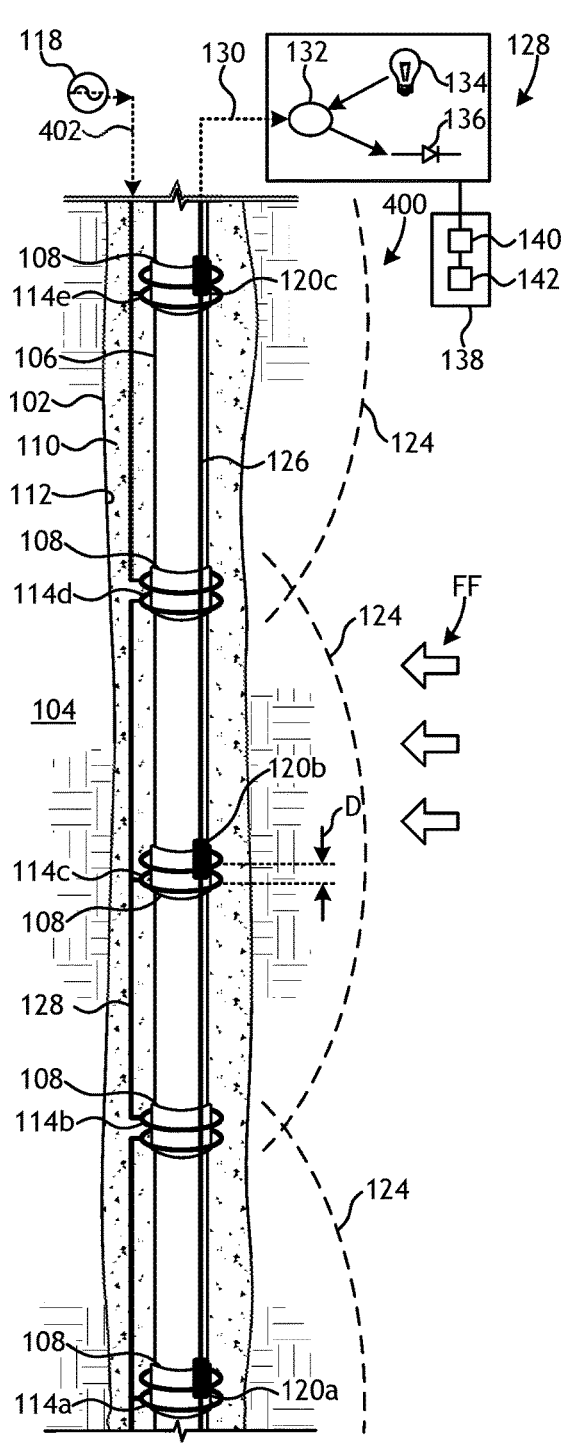
FIG. 4 illustrates another exemplary well system that can incorporate the principles of the present disclosure.

FIG. 4 depicts another exemplary well monitoring system 400 that can incorporate the principles of the present disclosure, according to one or more embodiments. The well monitoring system 400 may be similar in some respects to the well monitoring systems 100 and 300 of FIGS. 1A-1B and 3A-3C, respectively, and therefore may be best understood with reference thereto, where like numerals represent like elements or components not described again in detail. As illustrated, the casing 106 is again positioned within the wellbore 102 and cemented into place with the cement 110. Accordingly, the well monitoring system 400 may be characterized as a permanent reservoir monitoring system.

The well monitoring system 400 further includes the plurality of transmitter coils 114, shown as transmitter coils 114a, 114b, 114c, 114d, and 114e axially-spaced from each other along the casing 106. In the illustrated embodiment, the transmitter coils 114a-e are again depicted as being coupled to the casing collars 108, but could alternatively be positioned at other locations, without departing from the scope of the disclosure. Moreover, the well monitoring system 400 also includes the plurality of receiver coils 120, shown as receiver coils 120a, 120b, and 120c. Each receiver coil 120a-c may be mounted in close proximity to a corresponding one of the transmitter coils 114a-e, such as on a common casing collar 108, and otherwise axially offset from each other by the axial distance D (FIG. 3A).

In the illustrated embodiment, the transmitter coils 114a-e are positioned at each casing collar 108 while the receiver coils 120a-c are positioned at every other casing collar 108. Moreover, a single power line 128 is communicably coupled to each transmitter coil 114a-e and configured to supply a signal 402 to each transmitter coil 114a-e via the power supply 118. Axially adjacent transmitter coils 114a-e in the well monitoring system 400 are wound differently such that the second and fourth transmitter coils 114b,d act as transmitting coils and the first, third, and fifth transmitter coils 114a,c,e act as bucking coils to the adjacent receiver coils 120a-c. More particularly, the first, third, and fifth transmitter coils 114a,c,e (collectively referred to in this embodiment as the "bucking coils 114a,c,e") are wound in a first direction $A_1$ over a first number of turns $N_1$, while the second and fourth transmitter coils 114b,d (collectively referred to in this embodiment as the "transmitting coils 114b,d") are wound in a second direction $A_2$ over a second number of turns $N_2$. The first direction $A_1$ is opposite the second direction $A_2$, and the first number of turns $N_1$ is lower than the second number of turns $N_2$. As a result, while each receives the same signal 402 from the power supply 118, the transmitting coils 114b,d generate a magnetic field 124 between adjacent transmitting coils 114b,d and the bucking coils 114a,c,e operate to buck the direct coupling signal between the transmitting coils 114b,d and the adjacent receiver coils 120a-c.

Each receiver coil 120a-c may be configured to convert the detected magnetic fields 124 generated by the transmitting coils 114b,d into a potential difference after interaction with the formation 104 and the oncoming fluid flood FF. The receiver coils 120a-c are communicably coupled to the surface interface 128 via the communication cable 126, which is configured to receive and analyze measurements obtained by the receiver coils 120a-c and thereby track the location of the fluid flood FF in real-time. At least one advantage to the well monitoring system 400 is that it requires only a single power line 124. The resulting vertical resolution provided by the receiver coils 120a-c, however, is less as compared to the previously described well monitoring systems 100 and 300.

Figure 5:
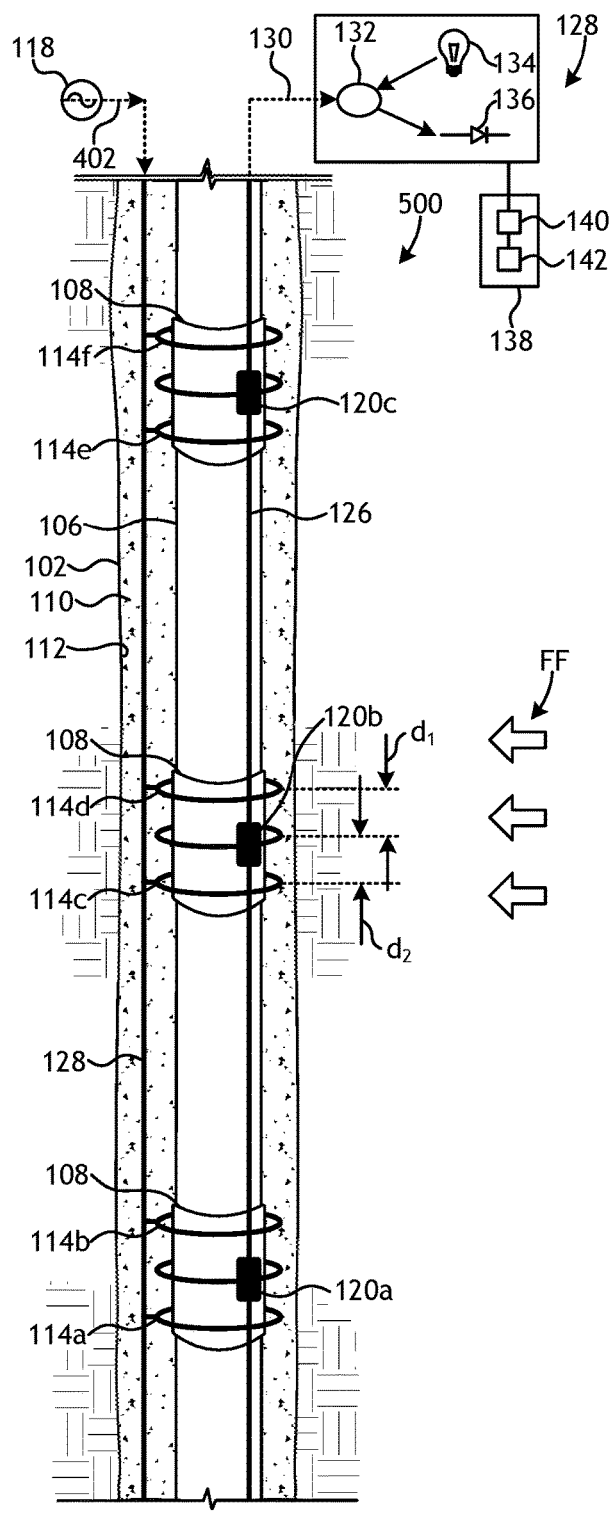
FIG. 5 illustrates another exemplary well system that can incorporate the principles of the present disclosure.

FIG. 5 depicts another exemplary well monitoring system 500 that can incorporate the principles of the present disclosure, according to one or more embodiments. The well monitoring system 500 may be similar in some respects to the well monitoring systems 100, 300, and 400 described herein and therefore may be best understood with reference thereto, where like numerals represent like elements or components not described again in detail. As illustrated, the casing 106 is again positioned within the wellbore 102 and cemented into place with the cement 110. Accordingly, the well monitoring system 500 may be characterized as a permanent reservoir monitoring system.

The well monitoring system 500 further includes the plurality of transmitter coils 114, shown as transmitter coils 114a, 114b, 114c, 114d, 114e, and 114f positioned at various axial locations along the casing 106, such as at the casing collars 108. In the illustrated embodiment, a plurality (two shown) of transmitter coils 114a-f are positioned at each axial location. While only two transmitter coils 114a-f are shown positioned at each axial location, more than two transmitter coils 114a-f may be positioned at each axial location, thereby rendering an array of multiple axially adjacent transmitter coils 114a-f at each axial location. The well monitoring system 500 also includes the plurality of receiver coils 120, shown as receiver coils 120a, 120b, and 120c. Each receiver coil 120a-c may be mounted in close proximity to the plurality of transmitter coils 114a-f positioned at each axial location, such as on a common casing collar 108.

In the illustrated embodiment, a single power line 128 is communicably coupled to each transmitter coil 114a-f and configured to supply the signal 402 to each transmitter coil 114a-f via the power supply 118. Axially adjacent transmitter coils 114a-f in the well monitoring system 500 are wound differently such that the second, fourth, and sixth transmitter coils 114b,d,f act as transmitting coils and the first, third, and fifth transmitter coils 114a,c,e act as bucking coils to the adjacent receiver coils 120a-c. More particularly, the first, third, and fifth transmitter coils 114a,c,e (collectively referred to in this embodiment as the "bucking coils 114a, c,e") are wound in a first direction $A_1$ over a first number of turns $N_1$, while the second, fourth, and sixth transmitter coils 114b,d,f (collectively referred to in this embodiment as the "transmitting coils 114b,d,f") are wound in a second direction $A_2$ over a second number of turns $N_2$. The first direction $A_1$ is opposite the second direction $A_2$, and the first number of turns $N_1$ is lower than the second number of turns $N_2$. As a result, while each receives the same signal 402 from the power supply 118, the transmitting coils 114b,d,f generate a magnetic field 124 between adjacent transmitting coils 114b,d and the bucking coils 114a,c,e operate to buck the direct coupling signal between the transmitting coils 114b, d,f and the adjacent receiver coils 120a-c.

In the illustrated embodiment, the transmitting coil 114b, d,f may be axially offset from the corresponding receiver coil 120a-c at the respective axial position by a first distance $d_1$, while the bucking coil 114a,c,e may be axially offset from the corresponding receiver coil 120a-c at the respective axial position by a second distance $d_2$. In some embodiments, the first and second distances $d_1$, $d_2$ may be the same. In other embodiments, however, the first and second distances $d_1$, $d_2$ may be different and otherwise manipulated to vary the dipole strength of the transmitting coil 114b,d,f. Accordingly, the placement of the transmitting coils 114b,d,f and the bucking coils 114a,c,e, the number of turns $N_1$, $N_2$, and the winding directions $A_1$, $A_2$, may be selected and otherwise optimized so that each receiver coil 120a-c is bucked using a single power line 128.

While only one transmitting coil 114b,d,f and one bucking coil 114a,c,e are shown at each axial position, more than one transmitting coil 114b,d,f and one bucking coil 114a,c,e may alternatively be employed at each axial position, without departing from the scope of the disclosure. Moreover, while the transmitting coils 114b,d,f and bucking coils 114a,c,e at each axial position are depicted as being positioned on axially opposite ends of the corresponding receiver coil 120a-c (i.e., the receiver coils 120a-c axially interpose the transmitting coils 114b,d,f and bucking coils 114a,c,e at each axial position), it is also contemplated herein to have the transmitting coils 114b,d,f and the bucking coils 114a,c,e juxtaposed on one axial end of the corresponding receiver coils 120a-c.

In any of the embodiments described herein, bucking of the receiver coils 120 can be applied in stages and, more particularly, the bucking can be calibrated to suit the particular application and particular well monitoring system. In some embodiments, for instance, the desired level for the bucking current 123 (FIGS. 1A-1B and 3A-3C) can first be determined before deployment into the wellbore 102 by a surface (or air) calibration. In embodiments where a specific bucking current 123 is not supplied by the power source 118 (i.e., well monitoring systems 400 and 500), the surface calibration may nonetheless be undertaken based on several parameters, such as, but not limited to, the spacing between the transmitter coils 114 and the receiver coils 120, the number of turns in the transmitter coils 114 used as bucking coils, and the resistivity of the formation 104 estimated from well logs. This surface calibration effectively removes the direct coupling signal between adjacent transmitter and receiver coils 114, 120.

After the casing 106 and associated well monitoring system is deployed and cemented in place within the wellbore 102, bucking of the receiver coils can again be calibrated and otherwise altered in a downhole calibration. In embodiments that use the bucking current 123, the bucking signal may be dynamically tuned while monitoring the formation signal at the corresponding receiver coils 120, where the formation signal comprises the resistivity of the formation 104 with no fluid flood FF. In embodiments where the specific bucking current 123 is not supplied by the power source 118, the signal 402 (FIGS. 4 and 5) may also be dynamically tuned while monitoring the formation signal at the corresponding receiver coils 120. As can be appreciated, different levels of bucking may be required for each receiver coil 120 due to unequal spacings between adjacent pairs of transmitter coils 114 and receiver coils 120 and possible dislocation of the transmitter coils 114 and receiver coils 120 during downhole deployment. This downhole calibration effectively removes the direct coupling signal between adjacent transmitter and receiver coils 114, 120 and the formation signal.

In all cases, the desired current level of bucking required to buck the formation signal at each receiver coil 120 may be stored in the computer 138 after calibration and may be subsequently applied to time-lapse measurements as the fluid flood FF approaches. Given the stored desired bucking current levels, the formation signal can be computed and mathematically added to the measured fluid flood FF signal if the total signal (i.e., no fluid flood FF signal+fluid flood FF signal) is required for inversion. As a result, the sensitivity of the receiver coils 120 is defined as the signal coming from the fluid flood FF divided by the total signal received.

Figure 6:
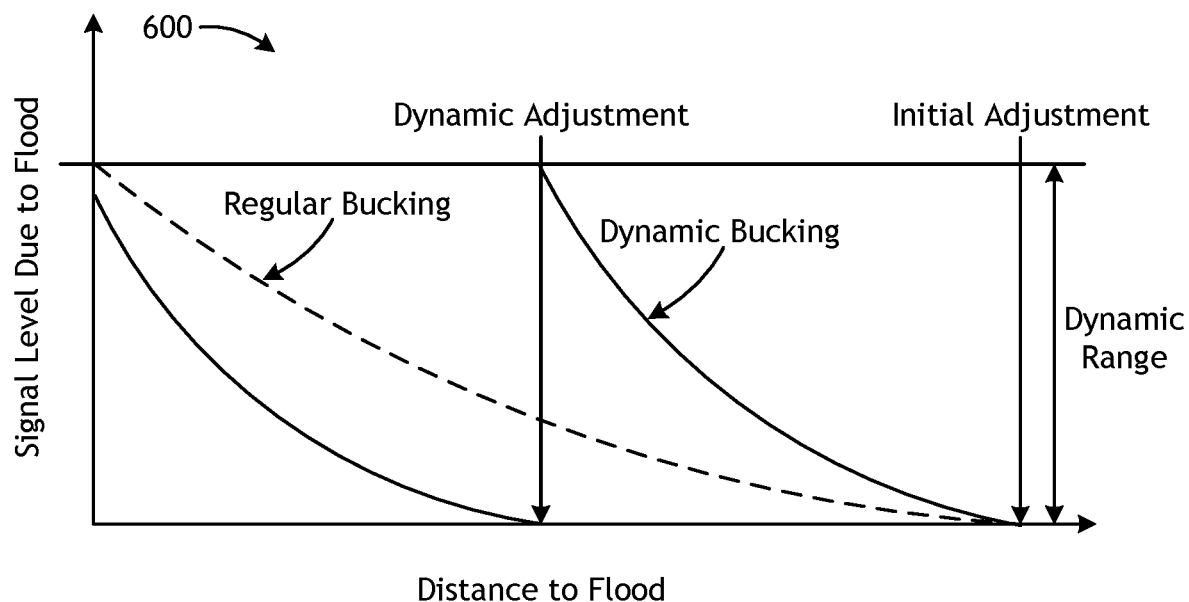
FIG. 6 is a plot that shows regular bucking versus dynamic bucking.

Bucking can also be adjusted dynamically during downhole operation while monitoring the fluid flood FF to enable dynamic range reuse or real-time calibration of the receiver coils 120. FIG. 6, for example, is a plot 600 that shows regular bucking versus dynamic bucking. In regular bucking, downhole calibration is done once in the absence of the fluid flood FF to compute the bucking currents required to cancel out the no flood signal (i.e., the formation signal). The stored bucking currents are then applied as the well monitoring system monitors the approaching fluid flood FF.

Dynamic bucking, on the other hand, helps prevent oversaturation of the receiver coils 120 as the fluid flood FF approaches the wellbore 102. As the fluid flood FF approaches the wellbore 102, the signal perceived by the receiver coils 120 will increase since more signal is coming from the fluid flood FF. The receiver coils 120, however, have an operable range of signals that they are able to detect. In dynamic bucking, the level of the transmitted signal (i.e., the bucking current 123 of FIGS. 1A-1B and 3A-3C or the signal 402 of FIGS. 4 and 5) may be dynamically and/or periodically adjusted once the fluid flood FF is first detected so that the signal level due to the fluid flood FF as it approaches the wellbore 102 remains within the operable range of the receiver coils 120. Doing so effectively sets a limit on the signal level that can be received from the fluid flood FF when the fluid flood FF is far from the wellbore 102 and, therefore, sets a limit on the maximum range of detection.

Dynamic bucking may also include adjusting the gain of the receiver coils 120 so that the signal from the fluid flood FF remains within the operable range of the receiver coils 120. With dynamic bucking, an operator is able to supply increased current (i.e., increasing the gain) so that the maximum operating condition of the receiver coils 120 may be reached at a point where the fluid flood FF is distant from the wellbore 102. Once that point is reached, the bucking current may again be dynamically adjusted to cancel out (or minimize) the fluid flood FF signal and start over by reusing the dynamic range. This may be done in real-time so that whenever the maximum signal is met, the bucking signal (current) may again be readjusted to modify the current of the transmitting signal to stay within the range of receiver. Dynamic bucking enables increasing the signal-to-ratio of distant fluid floods FF and consequently increases the range of detection. It also enables monitoring fluid floods FF with different shapes and/or contrasts without having to worry about signal saturation.

In some embodiments, the bucking signal (current) can be swept to take into account the distance differences between axially adjacent casing collars 108 in the casing 106 and, therefore, the axial offsets between axially adjacent bucking coils and receiver coils 120 may be different. For instance, some sections of the casing 106 may be under compression or in tension, which could result in sections of the casing 106 exhibiting different axial distances between casing collar 108 locations. Accordingly, in some embodiments, at least one of the phase and the amplitude of the bucking signal may be adjusted or "swept" in order to account for the spacing differences. As a result, a phase shift of the bucking signal may be aligned with the magnetic fields 124 emitted by the transmitting coils that suffer from a corresponding phase shift related to spacing differences. In at least one embodiment, the phase and/or the amplitude of the bucking signal may be adjusted to determine at what phase and/or amplitude the main signal is effectively bucked. In some embodiments, the bucking signal can be swept once for each receiver 120 to determine what phase and/or amplitude should be used to effectively nullify the main signal.

Figure 7:
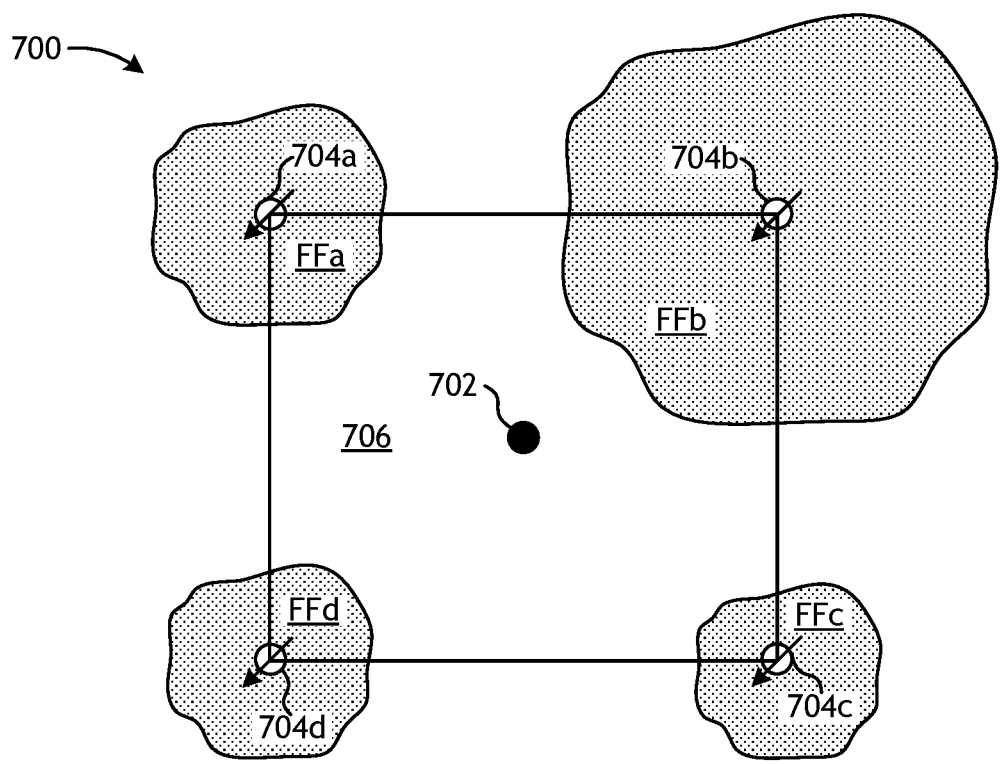
FIG. 7 is a schematic top view of a system of wells that may incorporate the principles of the present disclosure.

FIG. 7 is a schematic top view of a system of wells 700 that may incorporate the principles of the present disclosure. As illustrated, the system of wells 700 includes a producer well 702 and a plurality of injector wells 704, shown as injector wells 704a, 704b, 704c, and 704d. While four injector wells 704a-d are depicted in FIG. 7, more or less than four may be used without departing from the scope of the disclosure. Each injector well 704a-d may be configured to inject a fluid (water, steam, a chemical, etc.) into the surrounding subterranean formation 706, and thereby initiate corresponding fluid floods FF, shown as fluid floods $FF_a$, $FF_b$, $FF_c$, and $FF_d$, that advance radially toward the producer well 702. A permanent well monitoring system, such as any of the well monitoring systems 100, 300, 400, 500, may be deployed outside the casing in the producer well 702 to monitor the progress of the fluid floods $FF_{a-d}$.

Depending on the properties of the formation 706, the fluid flood $FF_{a-d}$ from one injector well 704a-d may breakthrough faster than the others. For example, the second fluid flood $FF_b$ is depicted in FIG. 7 as advancing faster than the other fluid floods $FF_{a,c,d}$. The receiver coils of the well monitoring system of the producer well 702 may become saturated by the second fluid flood $FF_b$, which may impede the detection of the other fluid floods $FF_{a,c,d}$. Dynamic bucking, however, can be used to cancel out (or minimize) the signal from the second fluid flood $FF_b$, allowing for the full dynamic range to be used to monitor the other fluid floods $FF_{a,c,d}$.

Those skilled in the art will readily appreciate the several advantages that the embodiments of the present disclosure provide over state-of-the-art permanent reservoir monitoring systems and methods. One advantage includes the improved dynamic range necessary for detecting fingering and low contrast fluid floods FF, as well as deep detection potential (50+ feet). Another advantage is the improved vertical resolution by successively controlling alternate transmitter coils so that each receiver coil receives from one main transmitter coil at a time. Moreover, in some of the disclosed embodiments, the transmitter coils may be are fed by two or three power lines, which minimizes multiplexing and electronic switching downhole. Bucking for the receiver coils can also be applied in stages to first buck the background (air) signal, subsequently detect the formation signal, and then buck the background and formation signals so as to be able to more effectively detect an approaching fluid flood FF signal. Furthermore, dynamic bucking enables dynamic range reuse to detect fluid floods FF that exhibit a variety of shapes and across a wide span of detection ranges.

Another advantage includes the ability to communicate received signals uphole using fiber optic methods, which obviates the need for active electronic components and circuits to be deployed downhole. Moreover, the embodiments of the present disclosure are also able to operate with other fiber optic-based sensor systems (e.g., distributed acoustic sensing, distributed temperature sensing, etc.). The presently described embodiments can also be integrated with intelligent well completions to minimize water production.

Those skilled in the art will recognize that the embodiments of the present disclosure may be used to monitor waterfloods due to natural coning or enhanced oil recovery (EOR). The present disclosure has direct relevance for the monitoring of oil, gas, $CO_2$, and/or water production and/or injection. The embodiments of the present disclosure can be deployed in onshore or offshore wells that are either vertical, high angle, or horizontal.

Embodiments disclosed herein include:

A. A well monitoring system that includes a plurality of transmitter coils coupled to an exterior of a casing positioned within a wellbore, wherein one or more first transmitter coils are positioned at a first location and one or more second transmitter coils are positioned at a second location axially offset from the first location, at least one receiver coil coupled to the exterior of the casing and positioned at the second location, wherein the at least one receiver coil and the one or more second transmitter coils are axially spaced from each other at the second location, and a power source communicably coupled to the one or more first and second transmitter coils, wherein the one or more first transmitter coils generates a magnetic field detectable by the at least one receiver coil, and the one or more second transmitter coils generates a bucking signal that minimizes a direct coupling between the one or more first transmitter coils and the at least one receiver coil.

B. A method that includes generating a magnetic field with at least one transmitting coil coupled to an exterior of a casing positioned within a wellbore, wherein the at least one transmitting coil is positioned at a first location along the casing, detecting the magnetic field with at least one receiver coil coupled to the exterior of the casing and positioned at a second location axially offset from the first location, generating a bucking signal with at least one bucking coil coupled to the exterior of the casing at the second position, wherein the at least one receiver coil and the at least one bucking coil are axially spaced from each other at the second location, and minimizing a direct coupling between the at least one transmitting coil and the at least one receiver coil with the bucking signal.

Each of embodiments A and B may have one or more of the following additional elements in any combination: Element 1: wherein the first and second locations correspond to casing collars coupled to the casing. Element 2: wherein the at least one receiver coil is a first receiver coil, the well monitoring system further comprising one or more third transmitter coils positioned at a third location axially offset from the second location such that the second location axially interposes the first and third locations, a second receiver coil coupled to the exterior of the casing and positioned at the third location and axially offset from the one or more third transmitter coils, a first power line extending from the power source and being communicably coupled to the one or more first and third transmitter coils, and a second power line extending from the power source and being communicably coupled to the one or more second transmitter coils, wherein, in a first cycle, the first power line provides a main current to the one or more first and third transmitter coils to generate the magnetic field and the second power line provides a bucking current to the one or more second transmitter coils to generate the bucking signal, and wherein, in a second cycle, the second power line provides the main current to the one or more second transmitter coils to generate the magnetic field and the first power line provides the bucking current to the one or more first and third transmitter coils to generate the bucking signal that minimizes a direct coupling between the one or more second transmitter coils and the second receiver coil. Element 3: wherein the at least one receiver coil is communicably coupled to a surface interface via a communication cable extended into the wellbore. Element 4: wherein the communication cable includes one or more optical waveguides and the surface interface comprises a light source that launches light into the one or more optical waveguides, an optical detector that receives reflected light from the at least one receiver coil, and a computer that processes measurement data from the optical detector. Element 5: wherein the at least one receiver coil is a first receiver coil, the well monitoring system further comprising one or more third transmitter coils positioned at a third location axially offset from the second location such that the second location axially interposes the first and third locations, a second receiver coil coupled to the exterior of the casing and positioned at the third location and axially offset from the one or more third transmitter coils, a third receiver coil coupled to the exterior of the casing and positioned at the first location and axially offset from the one or more first transmitter coils, a first power line extending from the power source and being communicably coupled to the one or more first transmitter coils, a second power line extending from the power source and being communicably coupled to the one or more second transmitter coils, and a third power line extending from the power source and being communicably coupled to the one or more third transmitter coils, wherein, in a first cycle, the first power line provides a main current to the one or more first transmitter coils to generate the magnetic field, the second power line provides a bucking current to the one or more second transmitter coils to generate the bucking signal, and the third power line is inactive, wherein, in a second cycle, the second power line provides the main current to the one or more second transmitter coils to generate the magnetic field, the third power line provides the bucking current to the one or more third transmitter coils to generate the bucking signal that minimizes a direct coupling between the one or more second transmitter coils and the second receiver coil, and the first power line is inactive, and wherein, in a third cycle, the third power line provides the main current to the one or more third transmitter coils to generate the magnetic field, the first power line provides the bucking current to the one or more first transmitter coils to generate the bucking signal that minimizes a direct coupling between the one or more first transmitter coils and the third receiver coil, and the second power line is inactive. Element 6: further comprising a power line that provides a signal to the one or more first and second transmitter coils, wherein the one or more first transmitter coils are wound in a first direction over a first number of turns and the one or more second transmitter coils are wound in a second direction over a second number of turns, where the first direction is opposite the second direction, and the first number of turns is greater than the second number of turns. Element 7: further comprising a power line that provides a signal to the one or more first and second transmitter coils, wherein at least one of the one or more second transmitter coils is wound in a first direction over a first number of turns and at least another one of the one or more second transmitter coils is wound in a second direction over a second number of turns, where the first direction is opposite the second direction, and the first number of turns is greater than the second number of turns.

Element 8: wherein the at least one transmitting coil is a first transmitting coil and the at least one receiver coil is a first receiver coil, the method further comprising generating the magnetic field with the first transmitting coil during a first cycle, generating a second magnetic field during a second cycle with a second transmitting coil coupled to the exterior of the casing at a third location axially offset from the second location such that the second location axially interposes the first and third locations, detecting the second magnetic field with a second receiver coil coupled to the exterior of the casing and positioned at the third location, generating a second bucking signal during the second cycle with the first transmitting coil, and minimizing a direct coupling between the second transmitting coil and the second receiver coil with the second bucking signal. Element 9: wherein the at least one transmitting coil is a first transmitting coil, the at least one receiver coil is a first receiver coil, and the at least one bucking coil is a first bucking coil, the method further comprising generating the magnetic field with the first transmitting coil during a first cycle, generating a second magnetic field during a second cycle with the first bucking coil, detecting the second magnetic field with a second receiver coil coupled to the exterior of the casing and positioned at a third location axially offset from the second location such that the second location axially interposes the first and third locations, generating a second bucking signal during the second cycle with a second bucking coil coupled to the exterior of the casing and positioned at the third location and thereby minimizing a direct coupling between the first bucking coil and the second receiver coil with the second bucking signal, generating a third magnetic field during a third cycle with the second bucking coil, detecting the second magnetic field with a third receiver coil coupled to the exterior of the casing and positioned at a fourth location axially offset from the third location such that the third location axially interposes the second and fourth locations, and generating a third bucking signal during the third cycle with a third bucking coil coupled to the exterior of the casing and positioned at the fourth location and thereby minimizing a direct coupling between the second bucking coil and the third receiver coil with the third bucking signal. Element 10: further comprising providing a signal to the at least one transmitter coil and the at least one bucking coil from a power line communicably coupled to a power source, wherein the at least one transmitter coil is wound in a first direction over a first number of turns and the at least one bucking coil is wound in a second direction over a second number of turns, where the first direction is opposite the second direction, and the first number of turns is greater than the second number of turns. Element 11: wherein the at least one transmitting coil is a first transmitting coil and a second transmitting coil is coupled to the exterior of the casing at the second position and axially spaced from the at least one receiver coil, the method further comprising providing a signal to the at least one bucking coil and the second transmitting coil from a power line communicably coupled to a power source, wherein the second transmitting coil is wound in a first direction over a first number of turns and the at least one bucking coil is wound in a second direction over a second number of turns, where the first direction is opposite the second direction, and the first number of turns is greater than the second number of turns. Element 12: further comprising calibrating the at least one bucking coil at a surface location in view of the direct coupling between the at least one transmitting coil and the at least one receiver coil, calibrating the at least one bucking coil within the wellbore in view of the direct coupling and a formation signal derived from a surrounding subterranean formation and thereby obtaining a desired bucking current, and applying the desired bucking current measurements of a fluid flood approaching the wellbore obtained by the at least one receiver coil. Element 13: wherein calibrating the at least one bucking coil at the surface location comprises measuring a level of the direct coupling with the at least one receiver coil, and adjusting a bucking current level provided to the at least one bucking coil to minimize the direct coupling. Element 14: wherein calibrating the at least one bucking coil within the wellbore comprises measuring a level of the direct coupling and the formation signal with the at least one receiver coil, and adjusting the bucking current level provided to the at least one bucking coil to minimize the direct coupling and the formation signal. Element 15: wherein calibrating the at least one bucking coil at the surface location comprises measuring a level of the direct coupling with the at least one receiver coil, and altering at least one of a spacing between the at least one transmitting coil and the at least one receiver coil and a number of turns in the at least one bucking coils to minimize the direct coupling. Element 16: wherein calibrating the at least one bucking coil within the wellbore comprises measuring a level of the direct coupling and the formation signal with the at least one receiver coil, and dynamically adjusting a signal provided to the at least one bucking coil to minimize the direct coupling and the formation signal. Element 17: further comprising dynamically altering the bucking signal as a fluid flood approaches the wellbore. Element 18: further comprising adjusting at least one of the phase and an amplitude of the bucking signal.

By way of non-limiting example, exemplary combinations applicable to A and B include: Element 3 with Element 4; Element 12 with Element 13; Element 13 with Element 14; Element 12 with Element 15; and Element 15 with Element 16.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A well monitoring system, comprising:
 a plurality of transmitter coils coupled to an exterior of a casing positioned within a wellbore, wherein one or more first transmitter coils are positioned at a first location and one or more second transmitter coils are positioned at a second location axially offset from the first location;
 at least one receiver coil coupled to the exterior of the casing and positioned at the second location, wherein the at least one receiver coil and the one or more second transmitter coils are axially spaced from each other at the second location; and
 a power source that generates a first cycle and a second cycle, the power source communicably coupled to the one or more first and second transmitter coils, wherein the one or more first transmitter coils generates a magnetic field detectable by the at least one receiver coil in response to the first cycle, and the one or more second transmitter coils generates a bucking signal that minimizes a direct coupling between the one or more first transmitter coils and the at least one receiver coil in response to the first cycle, wherein the one or more second transmitter coils generates a magnetic field detectable by the at least one other receiver coil in response to the second cycle, and the one or more first transmitter coils generates a bucking signal that minimizes a direct coupling between the one or more second transmitter coils and the at least one other receiver coil;

wherein casing is wellbore lining that includes lengths of pipe coupled end to end using at least one casing collar.

2. The well monitoring system of claim 1, wherein the first and second locations correspond to casing collars coupled to the casing.

3. The well monitoring system of claim 1, wherein the at least one receiver coil is a first receiver coil, the well monitoring system further comprising:
one or more third transmitter coils positioned at a third location axially offset from the second location such that the second location axially interposes the first and third locations;
a second receiver coil coupled to the exterior of the casing and positioned at the third location and axially offset from the one or more third transmitter coils;
a first power line extending from the power source and being communicably coupled to the one or more first and third transmitter coils; and
a second power line extending from the power source and being communicably coupled to the one or more second transmitter coils, wherein, in a first cycle, the first power line provides a main current to the one or more first and third transmitter coils to generate the magnetic field and the second power line provides a bucking current to the one or more second transmitter coils to generate the bucking signal, and
wherein, in a second cycle, the second power line provides the main current to the one or more second transmitter coils to generate the magnetic field and the first power line provides the bucking current to the one or more first and third transmitter coils to generate the bucking signal that minimizes a direct coupling between the one or more second transmitter coils and the second receiver coil.

4. The well monitoring system of claim 1, wherein the at least one receiver coil is communicably coupled to a surface interface via a communication cable extended into the wellbore.

5. The well monitoring system of claim 4, wherein the communication cable includes one or more optical waveguides and the surface interface comprises:
a light source that launches light into the one or more optical waveguides;
an optical detector that receives reflected light from the at least one receiver coil; and
a computer that processes measurement data from the optical detector.

6. The well monitoring system of claim 1, wherein the at least one receiver coil is a first receiver coil, the well monitoring system further comprising:
one or more third transmitter coils positioned at a third location axially offset from the second location such that the second location axially interposes the first and third locations;
a second receiver coil coupled to the exterior of the casing and positioned at the third location and axially offset from the one or more third transmitter coils;
a third receiver coil coupled to the exterior of the casing and positioned at the first location and axially offset from the one or more first transmitter coils;
a first power line extending from the power source and being communicably coupled to the one or more first transmitter coils;
a second power line extending from the power source and being communicably coupled to the one or more second transmitter coils; and
a third power line extending from the power source and being communicably coupled to the one or more third transmitter coils,
wherein, in a first cycle, the first power line provides a main current to the one or more first transmitter coils to generate the magnetic field, the second power line provides a bucking current to the one or more second transmitter coils to generate the bucking signal, and the third power line is inactive,
wherein, in a second cycle, the second power line provides the main current to the one or more second transmitter coils to generate the magnetic field, the third power line provides the bucking current to the one or more third transmitter coils to generate the bucking signal that minimizes a direct coupling between the one or more second transmitter coils and the second receiver coil, and the first power line is inactive, and
wherein, in a third cycle, the third power line provides the main current to the one or more third transmitter coils to generate the magnetic field, the first power line provides the bucking current to the one or more first transmitter coils to generate the bucking signal that minimizes a direct coupling between the one or more first transmitter coils and the third receiver coil, and the second power line is inactive.

7. The well monitoring system of claim 1, further comprising:
a power line that provides a signal to the one or more first and second transmitter coils,
wherein the one or more first transmitter coils are wound in a first direction over a first number of turns and the one or more second transmitter coils are wound in a second direction over a second number of turns, where the first direction is opposite the second direction, and the first number of turns is greater than the second number of turns.

8. The well monitoring system of claim 1, further comprising:
a power line that provides a signal to the one or more first and second transmitter coils,
wherein at least one of the one or more second transmitter coils is wound in a first direction over a first number of turns and at least another one of the one or more second transmitter coils is wound in a second direction over a second number of turns, where the first direction is opposite the second direction, and the first number of turns is greater than the second number of turns.

9. A method, comprising:
generating, in a first cycle, a magnetic field and, in a second cycle, a bucking signal with at least one transmitting coil coupled to an exterior of a casing positioned within a wellbore, wherein the at least one transmitting coil is positioned at a first location along the casing;

detecting, in response to the first cycle, the magnetic field with at least one receiver coil coupled to the exterior of the casing and positioned at a second location axially offset from the first location;

generating, in the first cycle, i another bucking signal and, in the second cycle, another magnetic field with at least one bucking other transmitting coil coupled to the exterior of the casing at the second position, wherein the at least one receiver coil and the at least one bucking other transmitting coil are axially spaced from each other at the second location;

detecting, in response to the first cycle, the other magnetic field with at least one other receiver coil coupled to the exterior of the casing and positioned at the first location axially offset from the second location; and minimizing a direct coupling between the at least one transmitting coil and the at least one receiver coil with the bucking signal;

minimizing another direct coupling between the at least one other transmitting coil and the at least one other receiver coil with the other bucking signal;

wherein casing is wellbore lining that includes lengths of pipe coupled end to end using casing collar.

10. The method of claim 9, wherein the at least one transmitting coil is a first transmitting coil and the at least one receiver coil is a first receiver coil, the method further comprising:
   generating the magnetic field with the first transmitting coil during a first cycle;
   generating a second magnetic field during a second cycle with a second transmitting coil coupled to the exterior of the casing at a third location axially offset from the second location such that the second location axially interposes the first and third locations;
   detecting the second magnetic field with a second receiver coil coupled to the exterior of the casing and positioned at the third location;
   generating a second bucking signal during the second cycle with the first transmitting coil; and
   minimizing a direct coupling between the second transmitting coil and the second receiver coil with the second bucking signal.

11. The method of claim 9, wherein the at least one transmitting coil is a first transmitting coil, the at least one receiver coil is a first receiver coil, and the at least one bucking coil is a first bucking coil, the method further comprising:
   generating the magnetic field with the first transmitting coil during a first cycle;
   generating a second magnetic field during a second cycle with the first bucking coil;
   detecting the second magnetic field with a second receiver coil coupled to the exterior of the casing and positioned at a third location axially offset from the second location such that the second location axially interposes the first and third locations;
   generating a second bucking signal during the second cycle with a second bucking coil coupled to the exterior of the casing and positioned at the third location and thereby minimizing a direct coupling between the first bucking coil and the second receiver coil with the second bucking signal;
   generating a third magnetic field during a third cycle with the second bucking coil;
   detecting the second magnetic field with a third receiver coil coupled to the exterior of the casing and positioned at a fourth location axially offset from the third location such that the third location axially interposes the second and fourth locations; and
   generating a third bucking signal during the third cycle with a third bucking coil coupled to the exterior of the casing and positioned at the fourth location and thereby minimizing a direct coupling between the second bucking coil and the third receiver coil with the third bucking signal.

12. The method of claim 9, further comprising:
   providing a signal to the at least one transmitter coil and the at least one bucking coil from a power line communicably coupled to a power source,
   wherein the at least one transmitter coil is wound in a first direction over a first number of turns and the at least one bucking coil is wound in a second direction over a second number of turns, where the first direction is opposite the second direction, and the first number of turns is greater than the second number of turns.

13. The method of claim 9, wherein the at least one transmitting coil is a first transmitting coil and a second transmitting coil is coupled to the exterior of the casing at the second position and axially spaced from the at least one receiver coil, the method further comprising:
   providing a signal to the at least one bucking coil and the second transmitting coil from a power line communicably coupled to a power source,
   wherein the second transmitting coil is wound in a first direction over a first number of turns and the at least one bucking coil is wound in a second direction over a second number of turns, where the first direction is opposite the second direction, and the first number of turns is greater than the second number of turns.

14. The method of claim 9, further comprising:
   calibrating the at least one bucking coil at a surface location in view of the direct coupling between the at least one transmitting coil and the at least one receiver coil;
   calibrating the at least one bucking coil within the wellbore in view of the direct coupling and a formation signal derived from a surrounding subterranean formation and thereby obtaining a desired bucking current; and
   applying the desired bucking current measurements of a fluid flood approaching the wellbore obtained by the at least one receiver coil.

15. The method of claim 14, wherein calibrating the at least one bucking coil at the surface location comprises:
   measuring a level of the direct coupling with the at least one receiver coil; and
   adjusting a bucking current level provided to the at least one bucking coil to minimize the direct coupling.

16. The method of claim 15, wherein calibrating the at least one bucking coil within the wellbore comprises:
   measuring a level of the direct coupling and the formation signal with the at least one receiver coil; and
   adjusting the bucking current level provided to the at least one bucking coil to minimize the direct coupling and the formation signal.

17. The method of claim 14, wherein calibrating the at least one bucking coil at the surface location comprises:
   measuring a level of the direct coupling with the at least one receiver coil; and
   altering at least one of a spacing between the at least one transmitting coil and the at least one receiver coil and a number of turns in the at least one bucking coils to minimize the direct coupling.

18. The method of claim 17, wherein calibrating the at least one bucking coil within the wellbore comprises:
  measuring a level of the direct coupling and the formation signal with the at least one receiver coil; and
  dynamically adjusting a signal provided to the at least one bucking coil to minimize the direct coupling and the formation signal.

19. The method of claim 9, further comprising dynamically altering the bucking signal as a fluid flood approaches the wellbore.

20. The method of claim 9, further comprising adjusting at least one of the phase and an amplitude of the bucking signal.

\* \* \* \* \*